(12) United States Patent
Mitani

(10) Patent No.: US 12,469,662 B2
(45) Date of Patent: Nov. 11, 2025

(54) FUSE, COMPOSITE FUSE, AND ELECTRICAL CONNECTION BOX

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kenichi Mitani, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 25 days.

(21) Appl. No.: 18/705,066

(22) PCT Filed: Oct. 14, 2022

(86) PCT No.: PCT/JP2022/038433
§ 371 (c)(1),
(2) Date: Apr. 26, 2024

(87) PCT Pub. No.: WO2023/074418
PCT Pub. Date: May 4, 2023

(65) Prior Publication Data
US 2025/0132116 A1    Apr. 24, 2025

(30) Foreign Application Priority Data
Oct. 27, 2021 (JP) .................. 2021-175775

(51) Int. Cl.
*H01H 31/12* (2006.01)
*H01H 85/157* (2006.01)
*H02G 3/08* (2006.01)

(52) U.S. Cl.
CPC ........ *H01H 85/157* (2013.01); *H01H 31/125* (2013.01); *H02G 3/08* (2013.01)

(58) Field of Classification Search
CPC .................................................... H01H 31/125
See application file for complete search history.

(56) References Cited

U.S. PATENT DOCUMENTS 3,489,978 A * 1/1970 Mikulecky ........... H01H 31/125
337/156
3,838,375 A * 9/1974 Frind ..................... H01H 85/18
337/276

(Continued)

FOREIGN PATENT DOCUMENTS

JP    2002-044835 A    2/2002
JP    2005-033882 A    2/2005

(Continued)

OTHER PUBLICATIONS

International Search Report, Application No. PCT/JP2022/038433, mailed Nov. 29, 2022. ISA/Japan Patent Office.

*Primary Examiner* — Hung V Ngo
(74) *Attorney, Agent, or Firm* — Honigman LLP

(57) ABSTRACT

A fuse includes a first connection portion, a second connection portion, and a fixing portion connected to the leading end of the second connection portion. The fixing portion includes a fixing hole passing therethrough along a fixing axis extending in a first direction. The fixing portion has a plurality of fixing pieces arranged side by side in a circumferential direction centered on the fixing axis. Each fixing piece is formed in an arc shape centered on the fixing axis. The fixing portion has a level difference at each predetermined angle in the circumferential direction due to the plurality of fixing pieces being arranged so as to be shifted with respect to each other in the first direction, and is formed into an open annular shape that has a first annular end and (Continued)

a second annular end are spaced apart from each other at a predetermined interval.

19 Claims, 16 Drawing Sheets

(56) References Cited

U.S. PATENT DOCUMENTS

| | | | | |
|---|---|---|---|---|
| 4,906,963 | A | * | 3/1990 | Ackermann ......... H01H 85/306 337/267 |
| 5,529,509 | A | | 6/1996 | Hayes et al. |
| 5,982,267 | A | * | 11/1999 | Locht ..................... H02B 11/26 337/186 |
| 2013/0207769 | A1 | * | 8/2013 | Faltermeier ............ H01H 85/24 337/290 |

FOREIGN PATENT DOCUMENTS

| | | | |
|---|---|---|---|
| JP | 2010-170853 | A | 8/2010 |
| JP | 2013-089551 | A | 5/2013 |
| JP | 2014-212608 | A | 11/2014 |
| JP | 2017-033690 | A | 2/2017 |

* cited by examiner

FUSE, COMPOSITE FUSE, AND ELECTRICAL CONNECTION BOX

CROSS-REFERENCE TO RELATED APPLICATIONS

This application is the U.S. national stage of PCT/JP2022/038433 filed on Oct. 14, 2022, which claims priority of Japanese Patent Application No. JP 2021-175775 filed on Oct. 27, 2021, the contents of which are incorporated herein.

TECHNICAL FIELD

The present disclosure relates to a fuse, a composite fuse, and an electrical connection box.

BACKGROUND

Conventionally, as disclosed in JP 2002-044835A and JP 2005-033882A, vehicles such as automobiles have been provided with electrical connection boxes such as junction boxes. Electrical wires that connect to a battery and various electrical components installed in the vehicle body are connected to the electrical connection box. Also, as disclosed in JP 2014-212608A, a vehicle such as an electric vehicle is provided with an electrical connection box (junction box, etc.) that includes a high-voltage circuit to which high-voltage electrical wires are connected. High-voltage electrical wires that connect to batteries and various electrical components installed in the vehicle body are connected to the electrical connection box.

Incidentally, in an electrical connection box to which high-voltage electrical wires are connected as described above, for example, a metal housing is required as a countermeasure against electromagnetic noise due to high voltages, and therefore there is room for improvement in terms of reducing size.

An object of the present disclosure is to provide a fuse, a composite fuse, and an electrical connection box by which a reduction in size can be achieved.

SUMMARY

A fuse of the present disclosure includes a columnar main body portion having a first end surface and a second end surface; a male tab provided on the first end surface; and a fixing tab provided on the second end surface, in which the main body portion is configured to melt when a current of a predetermined value or more flows between the male tab and the fixing tab, the fixing tab includes a first connection portion extending in a first direction in which the main body portion extends, a second connection portion extending from a leading end of the first connection portion in a second direction orthogonal to the first direction, and a fixing portion that is connected to a leading end of the second connection portion and has a fixing hole passing through the fixing portion along a fixing axis extending in the first direction, and the fixing portion has a plurality of fixing pieces that are arranged side by side in a circumferential direction centered on the fixing axis and that are formed into arc shapes centered on the fixing axis, and the fixing portion is formed into an open annular shape that has a level difference at each predetermined angle in the circumferential direction due to the plurality of fixing pieces being arranged so as to be shifted with respect to each other in the first direction, the open annular shape having a first annular end and a second annular end that are spaced apart from each other at a predetermined interval in the circumferential direction.

Also, a composite fuse of the present disclosure includes a plurality of the above-described fuses, the plurality of fuses are arranged such that the respective fixing axes are coaxial with each other, and the main body portions of the plurality of fuses are arranged at the same position in a direction along the respective fixing axes, and are mutually arranged on the same circumference centered on the respective fixing axes.

Also, an electrical connection box of the present disclosure includes: a metal housing; a positive-side bus bar accommodated in the housing; a negative-side bus bar that is accommodated in the housing and is formed so as to surround the positive-side bus bar; and a plurality of the above-described fuses, in which the plurality of fuses are surrounded by the negative-side bus bar, the main body portions of the plurality of fuses are arranged at the same position in a direction along the respective fixing axes, and are mutually arranged on the same circumference centered on the respective fixing axes, and the fixing tabs of the plurality of fuses are overlaid on each other so as to be in contact with each other, with the respective fixing axes coaxial with each other.

Effects

According to the present disclosure, it is possible to provide a fuse, a composite fuse, and an electrical connection box by which a reduction in size can be achieved.

DETAILED DESCRIPTION OF PREFERRED EMBODIMENTS

Figure 1:
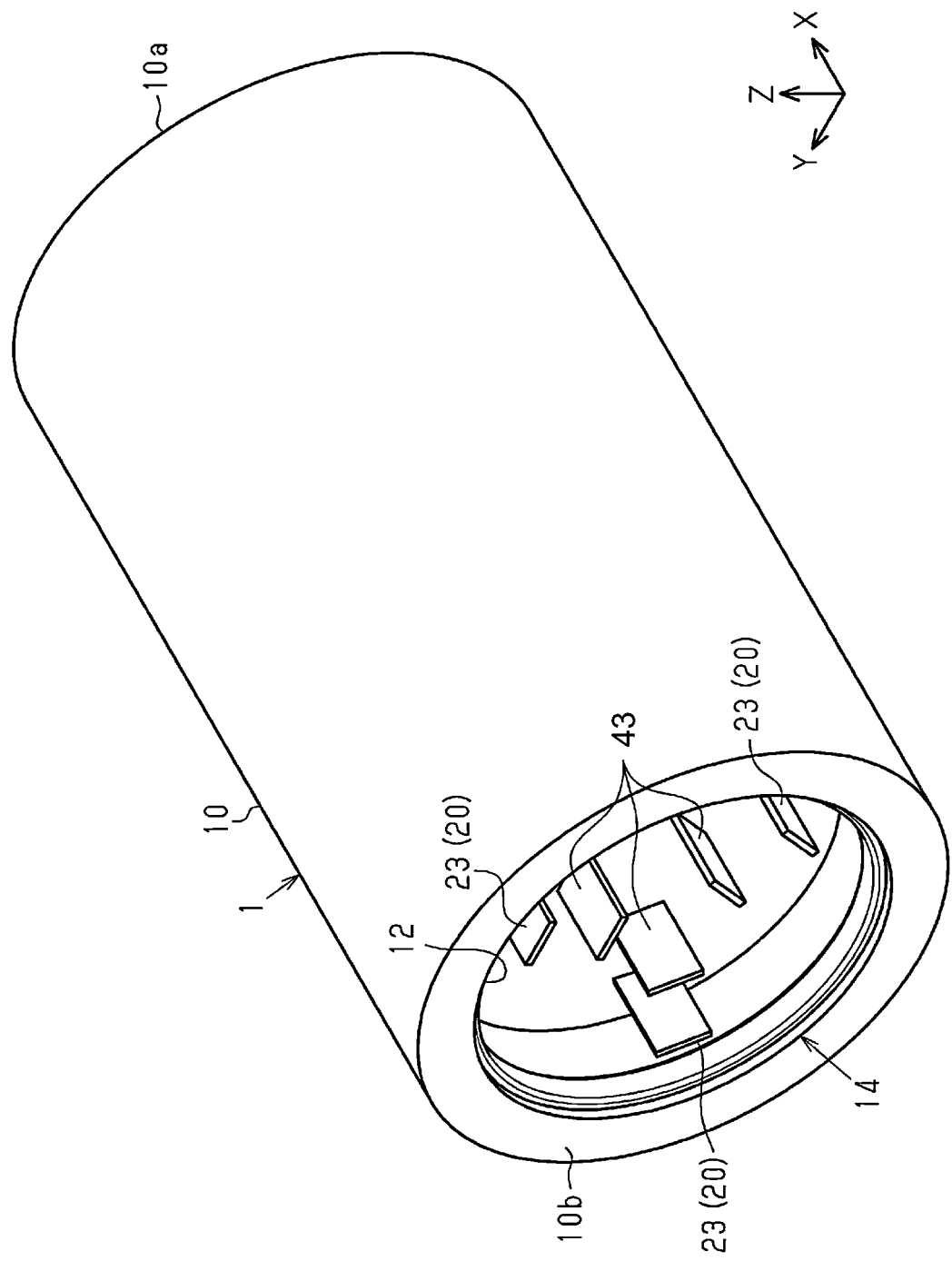
FIG. 1 is a perspective view of an electrical connection box according to a first embodiment.

First, embodiments of the present disclosure will be listed and described.

A fuse, including: a columnar main body portion having a first end surface and a second end surface; a male tab provided on the first end surface; and a fixing tab provided on the second end surface, in which the main body portion is configured to melt when a current of a predetermined value or more flows between the male tab and the fixing tab, the fixing tab includes a first connection portion extending in a first direction in which the main body portion extends, a second connection portion extending from a leading end of the first connection portion in a second direction orthogonal to the first direction, and a fixing portion that is connected to a leading end of the second connection portion and has a fixing hole passing through the fixing portion along a fixing axis extending in the first direction, and the fixing portion has a plurality of fixing pieces that are arranged side by side in a circumferential direction centered on the fixing axis and that are formed into arc shapes centered on the fixing axis, and the fixing portion is formed into an open annular shape that has a level difference at each predetermined angle in the circumferential direction due to the plurality of fixing pieces being arranged so as to be shifted with respect to each other in the first direction, the open annular shape having a first annular end and a second annular end that are spaced apart from each other at a predetermined interval in the circumferential direction.

According to this configuration, when using a plurality of fuses having the same shape and size as each other, due to the fixing portions of the fixing tabs being overlaid on each other so as to be shifted with respect to each other in the circumferential direction, the plurality of main body portions can be arranged three-dimensionally (non-linearly). For this reason, a plurality of fuses can be arranged at a high density. Accordingly, it is possible to provide a fuse suitable for reducing the size of a device including a plurality of fuses, such as an electrical connection box.

It is preferable that the plurality of fixing pieces are arranged at equal angular intervals in the circumferential direction.

According to this configuration, by using a plurality of fuses and arranging the main body portions of the plurality of fuses at equal intervals, it is possible to arrange the plurality of fuses at a high density.

It is preferable that each of the plurality of fixing pieces is formed so as to extend 120 degrees centered on the fixing axis.

According to this configuration, it is possible to arrange three fuses at a high density. Also, due to the fixing tabs of the three fuses being overlaid on each other so as to be shifted with respect to each other in the circumferential direction, it is possible to obtain three male tabs that are aligned in the first direction.

It is preferable that each of the plurality of fixing pieces is formed so as to extend 90 degrees centered on the fixing axis.

According to this configuration, it is possible to arrange four fuses at a high density. Also, due to the fixing tabs of the four fuses being overlaid on each other so as to be shifted with respect to each other in the circumferential direction, it is possible to obtain four male tabs that are aligned in the first direction.

A composite fuse including a plurality of the above-described fuses, in which the plurality of fuses are arranged such that the respective fixing axes are coaxial with each other, and the main body portions of the plurality of fuses are arranged at the same position in a direction along the respective fixing axes, and are mutually arranged on the same circumference centered on the respective fixing axes.

According to this configuration, a plurality of fuses can be arranged at a high density. As a result, it is possible to reduce the size of a composite fuse including a plurality of fuses. Also, it is possible to reduce the size of a device including a composite fuse, such as an electrical connection box.

An electrical connection box including: a metal housing; a positive-side bus bar accommodated in the housing; a negative-side bus bar that is accommodated in the housing and is formed so as to surround the positive-side bus bar; and the above-described composite fuse, in which the plurality of fuses are surrounded by the negative-side bus bar, the main body portions of the plurality of fuses are arranged at the same position in a direction along the respective fixing axes, and are mutually arranged on the same circumference centered on the respective fixing axes, and the fixing tabs of the plurality of fuses are overlaid on each other so as to be in contact with each other, with the respective fixing axes coaxial with each other.

According to this configuration, the negative-side bus bar surrounding the positive-side bus bar and the metal housing serve as a noise shield, and therefore the thickness of the metal housing can be reduced. Also, a plurality of fuses can be arranged at a high density. With these, it is possible to reduce the size of the electrical connection box.

It is preferable that the male tab of the fuse has the same potential as the positive-side bus bar.

According to this configuration, portions having the same potential as the positive-side bus bar are surrounded by the negative-side bus bar, and noise is suppressed.

It is preferable that the fixing tab of the fuse is electrically connected to the positive-side bus bar.

According to this configuration, the male tab of the fuse can have the same potential as the positive-side bus bar.

It is preferable that the negative-side bus bar has a bus bar-side male tab arranged so as to oppose the male tab of the fuse.

According to this configuration, since the male tabs and the bus bar-side male tabs that are arranged so as to oppose each other form pairs to form a connection terminal, devices can be connected directly or via electrical wires.

It is preferable that the positive-side bus bar has a positive-side connection tab, and the negative-side bus bar has a negative-side connection tab arranged so as to oppose the positive-side connection tab.

According to this configuration, since the positive-side connection tab and the negative-side connection tab arranged so as to oppose each other form a pair to form a connection terminal, a device can be connected directly or via electrical wires.

Specific examples of the fuse and the electrical connection box of the present disclosure will be described below with reference to the drawings. In each drawing, a portion of the configuration may be exaggerated or simplified for convenience of description. Also, the dimensional proportions of each part may differ in each drawing. In this specification, "parallel" and "orthogonal" encompass not only the case of being strictly parallel and orthogonal, but also the case of being approximately parallel and orthogonal within a range in which the effects of this embodiment are exhibited. Note that the present disclosure is not limited to these examples, but is indicated by the scope of the claims, and all modifications within the meaning and scope equivalent to the scope of the claims are intended to be encompassed therein.

Electrical Connection Box

An electrical connection box according to an embodiment will be described below with reference to FIGS. 1 to 7.

Figure 2:
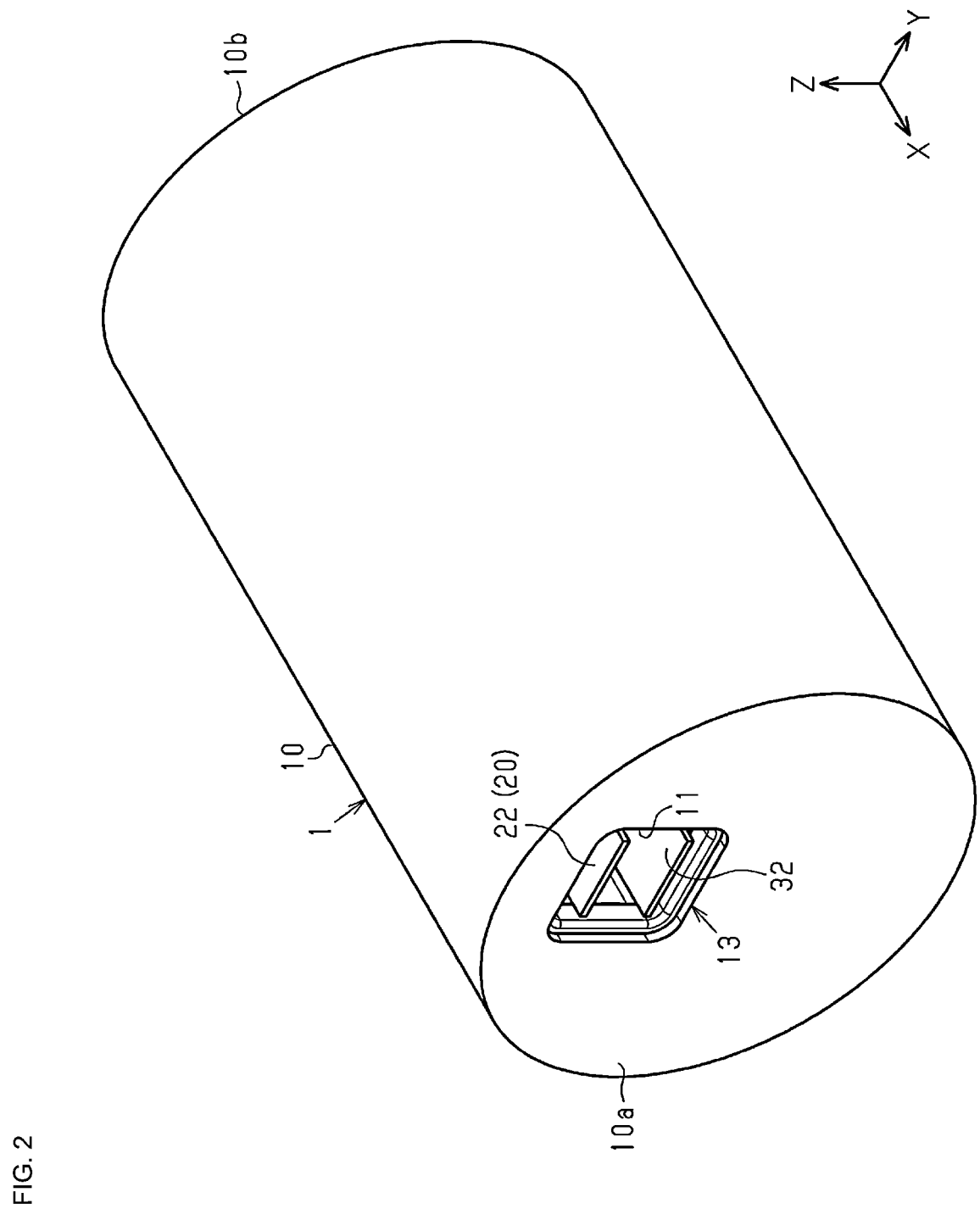
FIG. 2 is a perspective view of the electrical connection box according to the first embodiment.

As shown in FIGS. 1 and 2, the electrical connection box 1 of this embodiment has a housing 10 formed in a columnar shape. The housing 10 is made of metal. The housing 10 has a first end surface 10a and a second end surface 10b that are circular. In this embodiment, the direction in which the first end surface 10a faces is defined as the X direction, one of the radial directions of the circular first end surface 10a is defined as the Y direction, and the direction orthogonal to the X direction and the Y direction is defined as the Z direction. The housing 10 of this embodiment is formed into a columnar shape having a central axis in the X direction.

A first connection recess 11 is formed in the first end surface 10a of the housing 10. The electrical connection box 1 has a first external terminal 13 (first connection terminal) provided in the first connection recess 11. The first external terminal 13 includes a positive-side connection tab 32 and a negative-side connection tab 22.

A second connection recess 12 is formed in the second end surface 10b of the housing 10. The electrical connection box 1 has a second external terminal 14 (second connection terminal) provided in the second connection recess 12. The second external terminal 14 includes a plurality of pairs of male tabs 43 and bus bar-side male tabs 23. In this embodiment, the second external terminal 14 includes three pairs each including a male tab 43 and a bus bar-side male tab 23.

Figure 7:
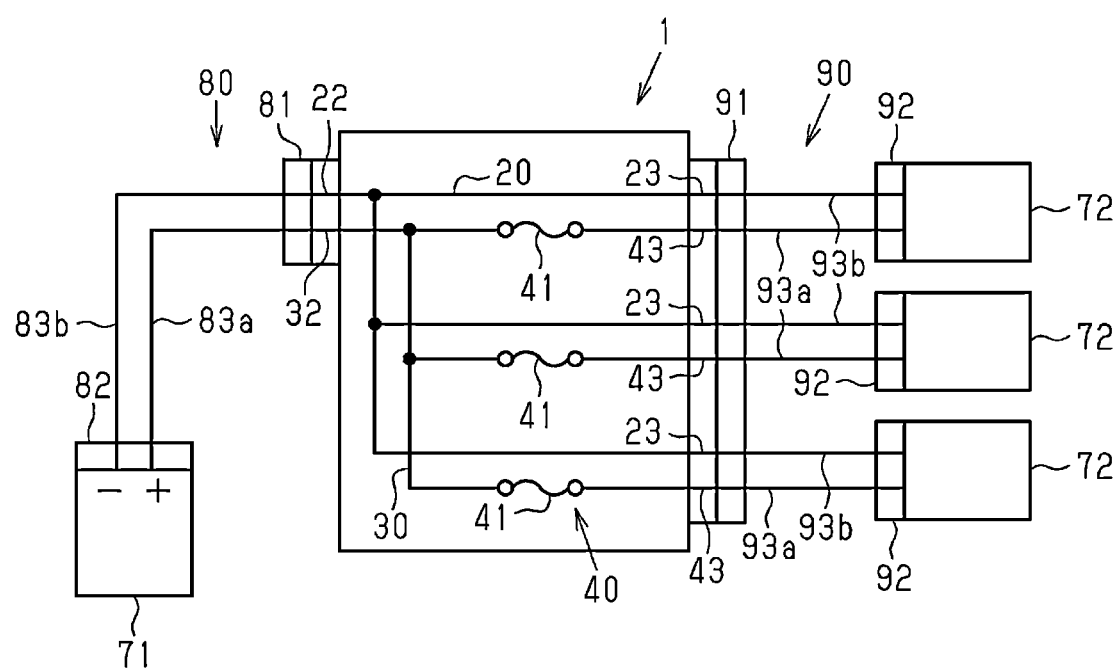
FIG. 7 is a block circuit diagram showing connections of the electrical connection box of FIG. 1.

The first connection recess 11 is for inserting a connector 81 shown in FIG. 7. The connector 81 is provided in a wire harness 80 that connects the electrical connection box 1 and a device 71 to each other. The wire harness 80 includes the connector 81, a connector 82 connected to the device 71, and a positive-side electrical wire 83a and negative-side electrical wire 83b between the connector 81 and the connector 82.

Note that the electrical connection box 1 may also be configured to be directly connected to the device 71 provided in a vehicle. For example, the first connection recess 11 of the electrical connection box 1 directly connects the first external terminal 13 (positive-side connection tab 32 and negative-side connection tab 22) shown in FIG. 2 to the terminal of the connector 71a of the device 71. The electrical connection box 1 is fixed to a housing of the device 71, for example. With this configuration, the wire harness 80 can be omitted, and the device 71 and the electrical connection box 1 can be easily connected to each other.

The device 71 is an electrical device provided in a vehicle, such as a battery pack, a charge/discharge controller connected to a battery pack, or the like. The device 71 includes a positive terminal and a negative terminal, and the positive terminal and the negative terminal are connected to the positive-side electrical wire 83a and the negative-side electrical wire 83b, respectively. The electrical connection box 1 is connected to the device 71 by the wire harness 80. The positive-side connection tab 32 of the first external terminal 13 of the electrical connection box 1 is connected to the positive-side terminal of the device 71 by the positive-side electrical wire 83a of the wire harness 80. The negative-side connection tab 22 of the first external terminal 13 of the electrical connection box 1 is connected to the negative-side terminal of the device 71 by the negative-side electrical wire 83b of the wire harness 80.

The second connection recess 12 of the second end surface 10b shown in FIG. 1 is for inserting a connector 91 shown in FIG. 7.

As shown in FIG. 7, the connector 91 is provided in a wire harness 90 that connects the electrical connection box 1 and a plurality of devices 72 to each other. The wire harness 90 includes the connector 91, connectors 92 connected to the devices 72, and positive-side electrical wires 93a and negative-side electrical wires 93b between the connector 91 and the connectors 92.

The devices 72 are electrical devices provided in a vehicle, such as a motor, a unit for driving the motor, a voltage converter, a low-voltage battery unit, and the like. Each of the devices 72 includes a positive terminal and a negative terminal. The devices 72 and the electrical connection box 1 are electrically connected by the wire harness 90. The positive terminals of the devices 72 are connected to the male tabs 43 forming the second external terminal 14 of the electrical connection box 1 by the positive-side electrical wires 93a of the wire harness 90. The negative terminals of the devices 72 are connected to the bus bar-side male tabs 23 forming the second external terminal 14 of the electrical connection box 1 by the negative-side electrical wires 93b of the wire harness 90.

As shown in FIGS. 3 to 6, the electrical connection box 1 includes a negative-side bus bar 20, a positive-side bus bar 30, and a composite fuse 40, which are accommodated in the housing 10.

Figure 3:
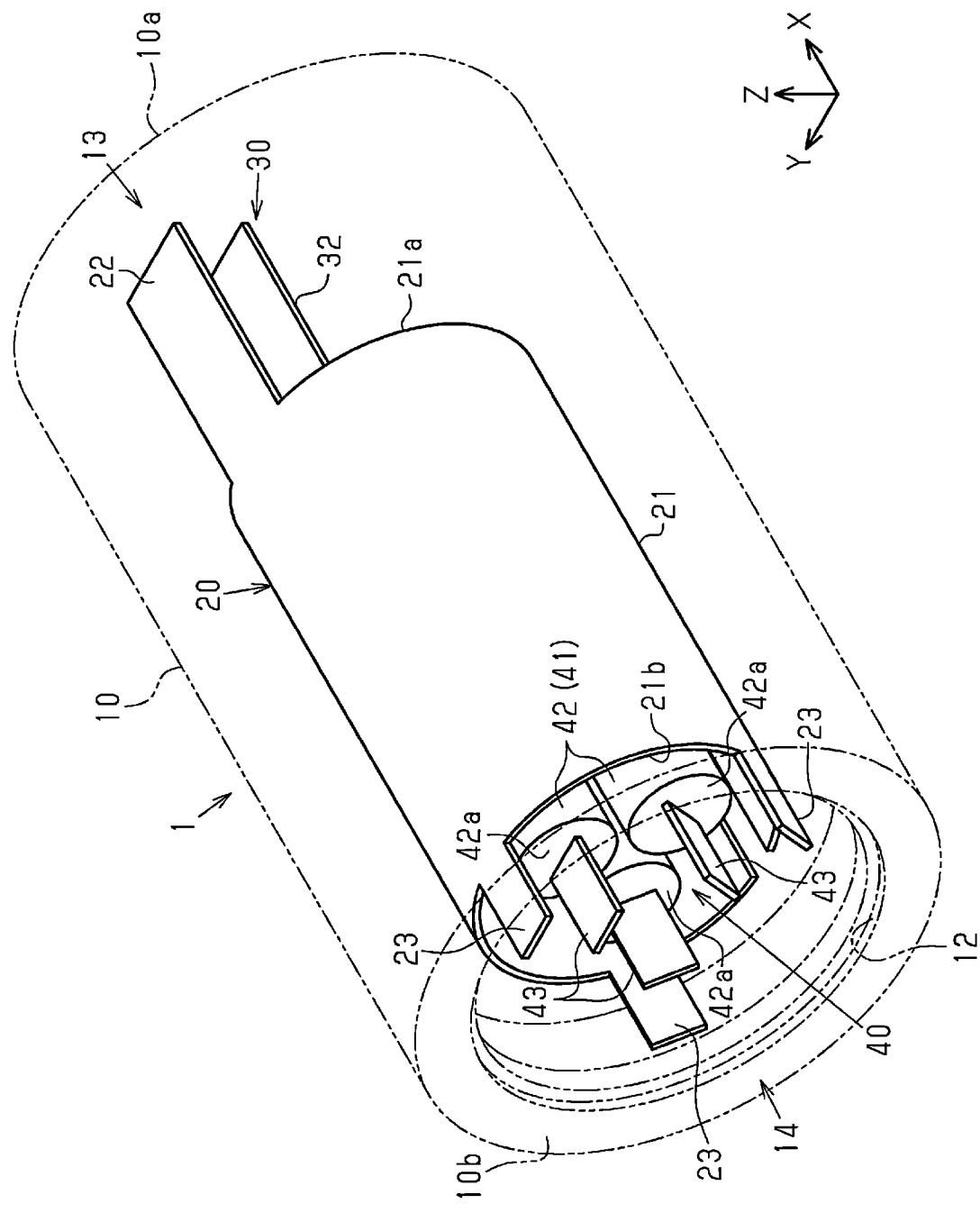
FIG. 3 is a perspective view showing an internal configuration of the electrical connection box according to the first embodiment.
Figure 4:
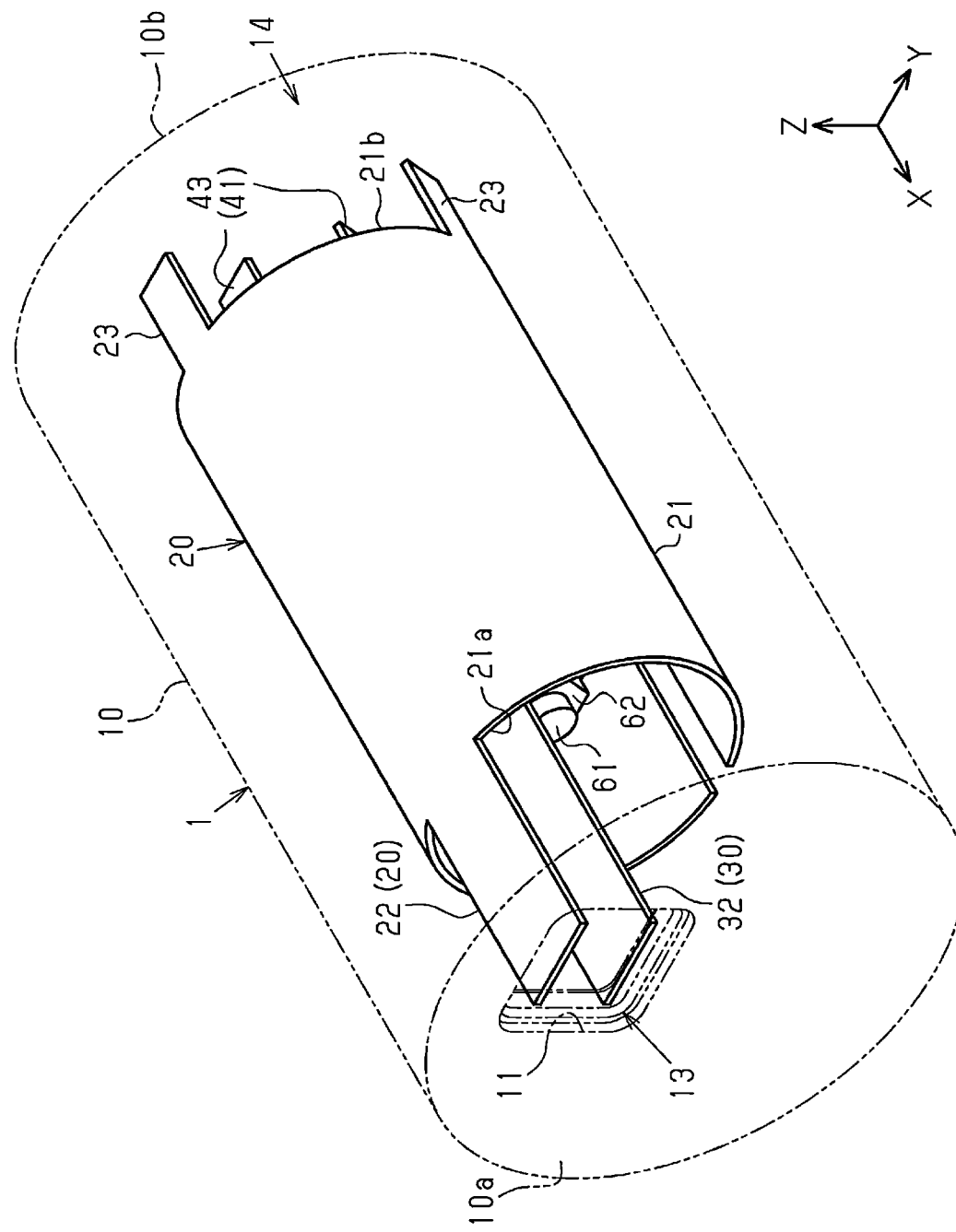
FIG. 4 is a perspective view showing the internal configuration of the electrical connection box according to the first embodiment.
Figure 5:
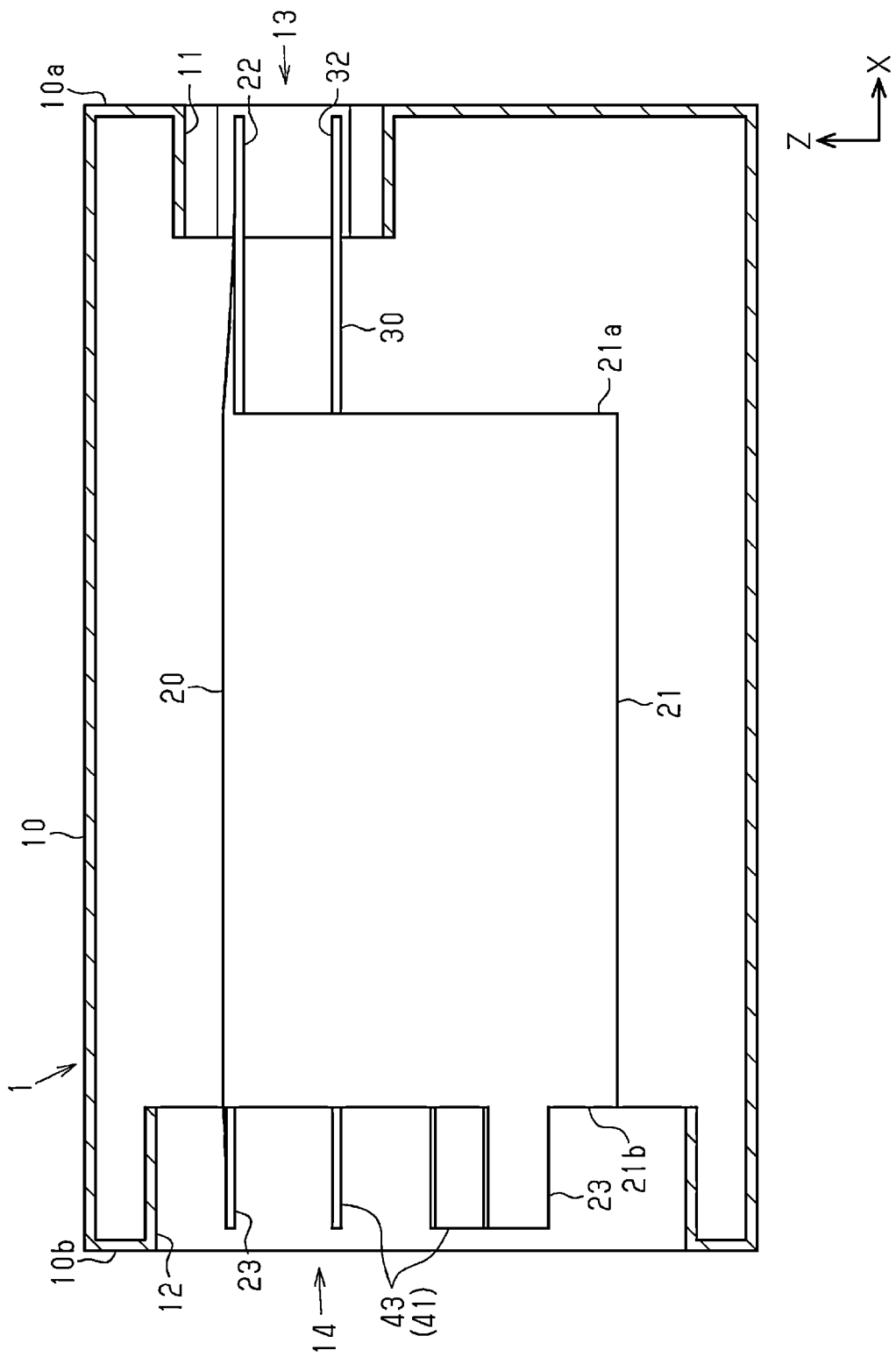
FIG. 5 is a cross-sectional view of the electrical connection box according to the first embodiment.

As shown in FIG. 3, the composite fuse 40 of this embodiment is constituted by three fuses 41. The three fuses 41 have the same shape and size as each other.

Figure 6:
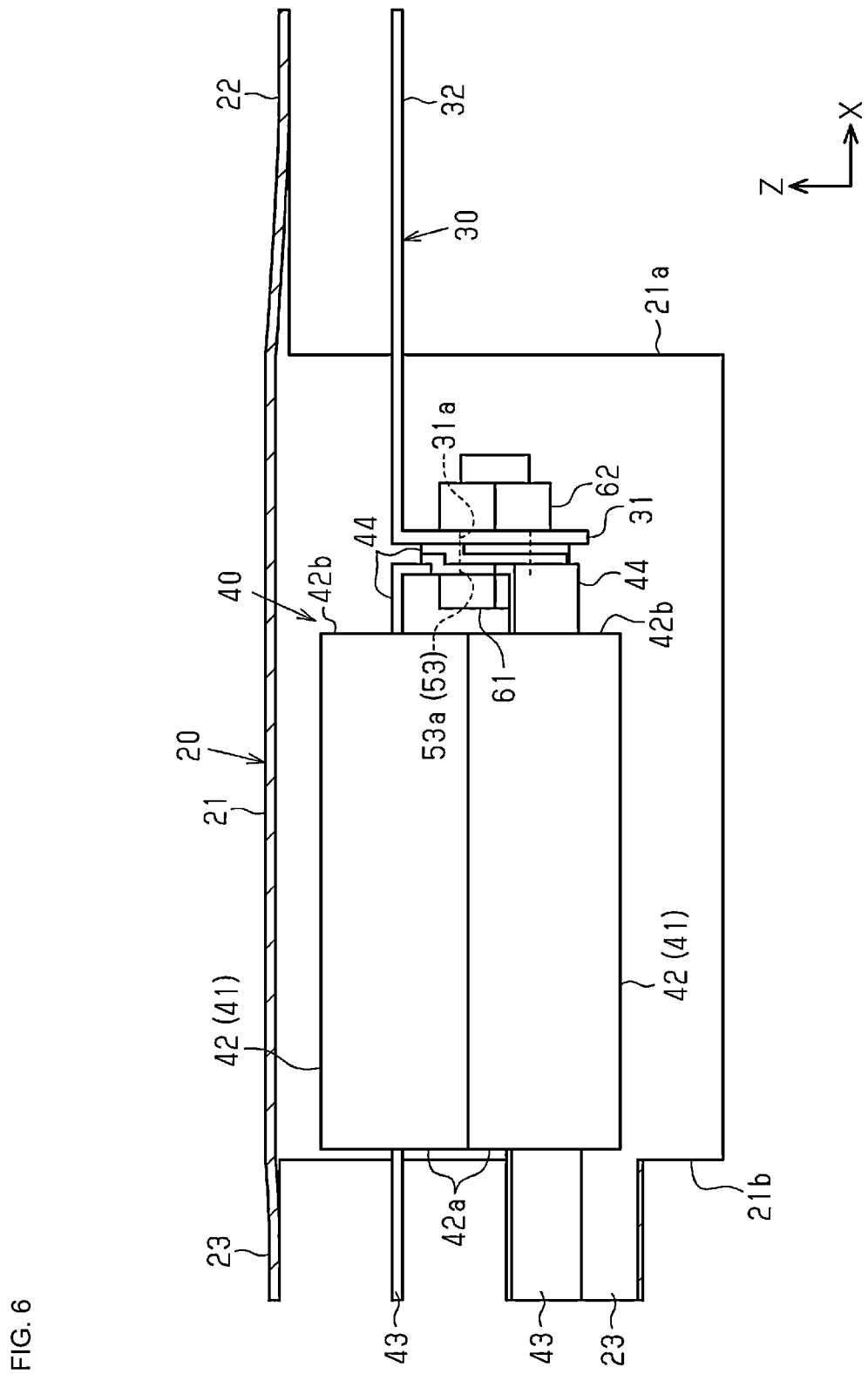
FIG. 6 is a side view showing a bus bar and a fuse.

As shown in FIG. 6, the fuse 41 includes a main body portion 42, a male tab 43, and a fixing tab 44. The main body portion 42 is formed in a columnar shape and has a first end surface 42a and a second end surface 42b. The main body portion 42 is configured to melt when a current exceeding a specified value flows between the male tab 43 and the fixing tab 44.

The male tab 43 is provided on the first end surface 42a of the main body portion 42. The fixing tab 44 is provided on the second end surface 42b of the main body portion 42. In this embodiment, the male tab 43 is formed so as to protrude from the first end surface 42a of the main body portion 42. In this embodiment, the fixing tab 44 is formed so as to protrude from the second end surface 42b of the main body portion 42. In this embodiment, the fixing tabs 44 of the three fuses 41 are joined to each other by a bolt 61 and a nut 62.

The three fuses 41 are joined to each other by one bolt 61 and one nut 62. These fuses 41 are arranged in a three-dimensional (3D) form. Specifically, the fuses 41 are arranged at equal angular intervals along the circumferential direction of a circle centered on the bolt 61. In other words, the three fuses 41 are arranged on each side (each vertex) of an equilateral triangle centered on the bolt 61. That is, the three fuses 41 are arranged in a direction along one side of the equilateral triangle and in a direction along one side different from that side. In this way, by arranging the three fuses 41 in a 3D form, in comparison to the case of arranging the three fuses 41 side by side in a row, it is possible to achieve a higher density, the volume taken up by the three fuses 41 can be reduced, and the electrical connection box 1 can be made smaller.

As shown in FIG. 6, the positive-side bus bar 30 includes a fixing portion 31 and a positive-side connection tab 32. The fixing portion 31 and the positive-side connection tab 32 extend in directions orthogonal to each other. As a result, the positive-side bus bar 30 is formed into an L shape due to the fixing portion 31 and the positive-side connection tab 32. The fixing portion 31 is electrically connected to the fixing tabs 44 of the fuses 41 constituting the composite fuse 40.

In this embodiment, the positive-side bus bar 30 is joined to the fixing tabs 44 of the fuses 41 by the bolt 61 and the nut 62. A through hole 31a is formed in the fixing portion 31 of the positive-side bus bar 30. A bolt 61 for fixing the fuses 41 is inserted through the through hole 31a. That is, the fixing tabs 44 of the fuses 41 and the positive-side bus bar 30 of this embodiment are joined to each other by the bolt 61 and nut 62. As a result, the fixing tab 44 of each fuse 41 has the same potential as the positive-side bus bar 30. Furthermore, the male tab 43 of each fuse 41 has the same potential as the positive-side bus bar 30.

The negative-side bus bar 20 is formed so as to surround the positive-side bus bar 30. Specifically, the negative-side bus bar 20 is formed so as to surround portions having the same potential as the positive-side bus bar 30. That is, the negative-side bus bar 20 is formed so as to surround the positive-side bus bar 30 and each fuse 41 connected to the positive-side bus bar 30.

The negative-side bus bar 20 is made of metal. The metal negative-side bus bar 20 serves as a countermeasure against electromagnetic noise, that is, as a noise shield for the positive-side bus bar 30 and the fuses 41 that are surrounded by the negative-side bus bar 20. The metal housing 10 that accommodates the negative-side bus bar 20, the positive-side bus bar 30, and the fuses 41 serves as a countermeasure against electromagnetic noise, that is, as a noise shield. In the electrical connection box 1 of this embodiment, the metal housing 10 and the metal negative-side bus bar 20 serve as a noise shield. For this reason, the metal housing 10 can be made thinner, and the electrical connection box 1 can be made smaller.

The negative-side bus bar 20 is made of metal. The negative-side bus bar 20 of this embodiment is formed into an approximate circular tube shape. For example, the negative-side bus bar 20 is formed into a circular tube shape by rolling up a metal flat plate.

The negative-side bus bar 20 includes a main body portion 21, one negative-side connection tab 22, and three bus bar-side male tabs 23. The main body portion 21 is formed in a circular tube shape and has a first end portion 21a on the first end surface 10a side of the housing 10, and a second end portion 21b on the second end surface 10b side of the housing 10. The negative-side connection tab 22 is formed so as to protrude from the first end portion 21a of the main body portion 21. The three bus bar-side male tabs 23 are formed so as to protrude from the second end portion 21b of the main body portion 21. The three bus bar-side male tabs 23 are arranged at equal angular intervals along the circumferential surface of the circular tube-shaped main body 21. The bus bar-side male tabs 23 are arranged opposing the male tabs 43 of the fuses 41.

The positive-side connection tab 32 and the negative-side connection tab 22 form a pair and function as a connection terminal for connecting the positive-side electrical wire 83a and the negative-side electrical wire 83b shown in FIG. 7. Also, the male tabs 43 and the bus bar-side male tabs 23 form pairs and function as a connection terminal for connecting the positive-side electrical wires 93a and the negative-side electrical wires 93b shown in FIG. 7.

Composite Fuse and Fuses

Next, the composite fuse 40 and the fuses 41 of an embodiment will be described with reference to FIGS. 8 to 14.

Figure 8:
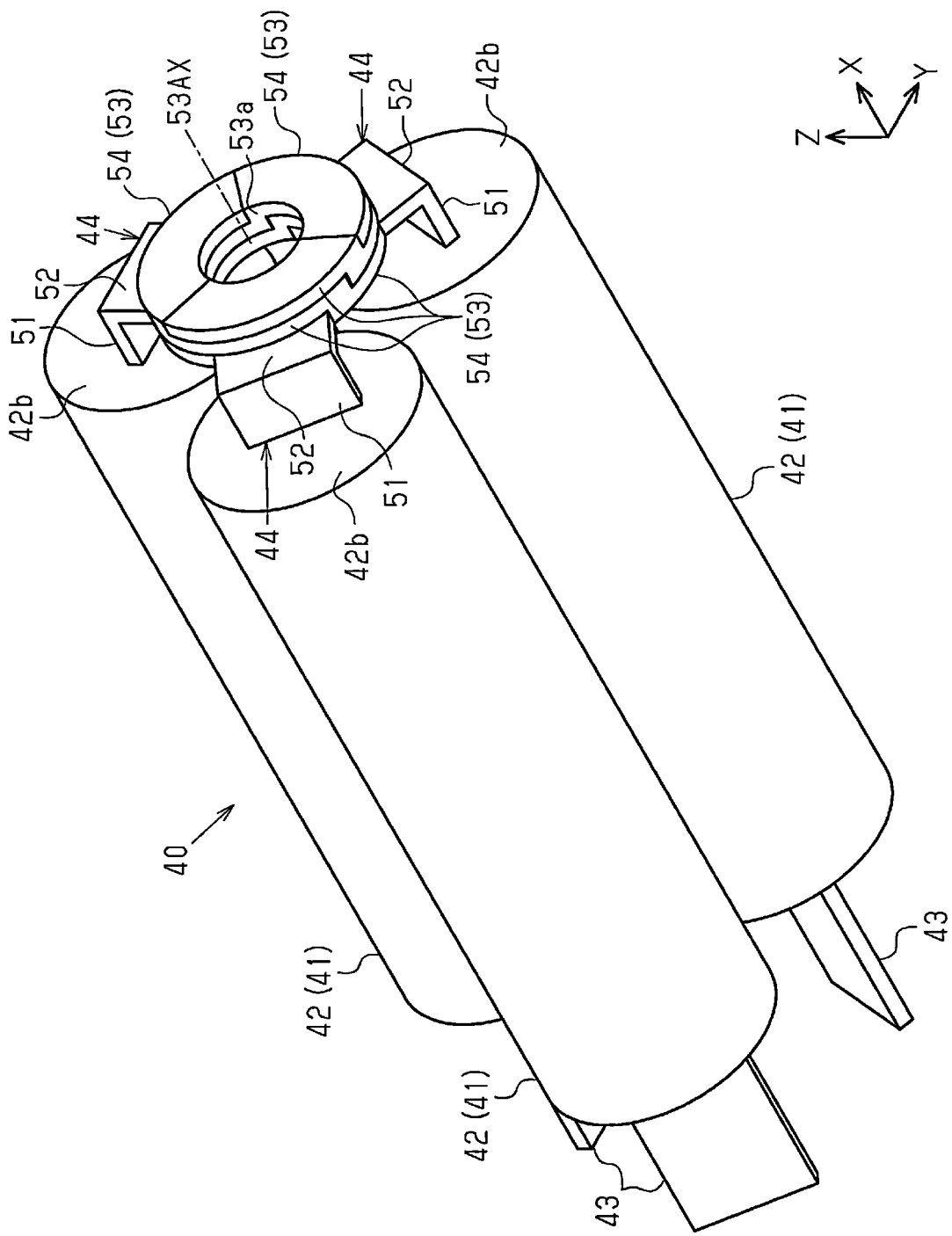
FIG. 8 is a perspective view showing a composite fuse.
Figure 9:
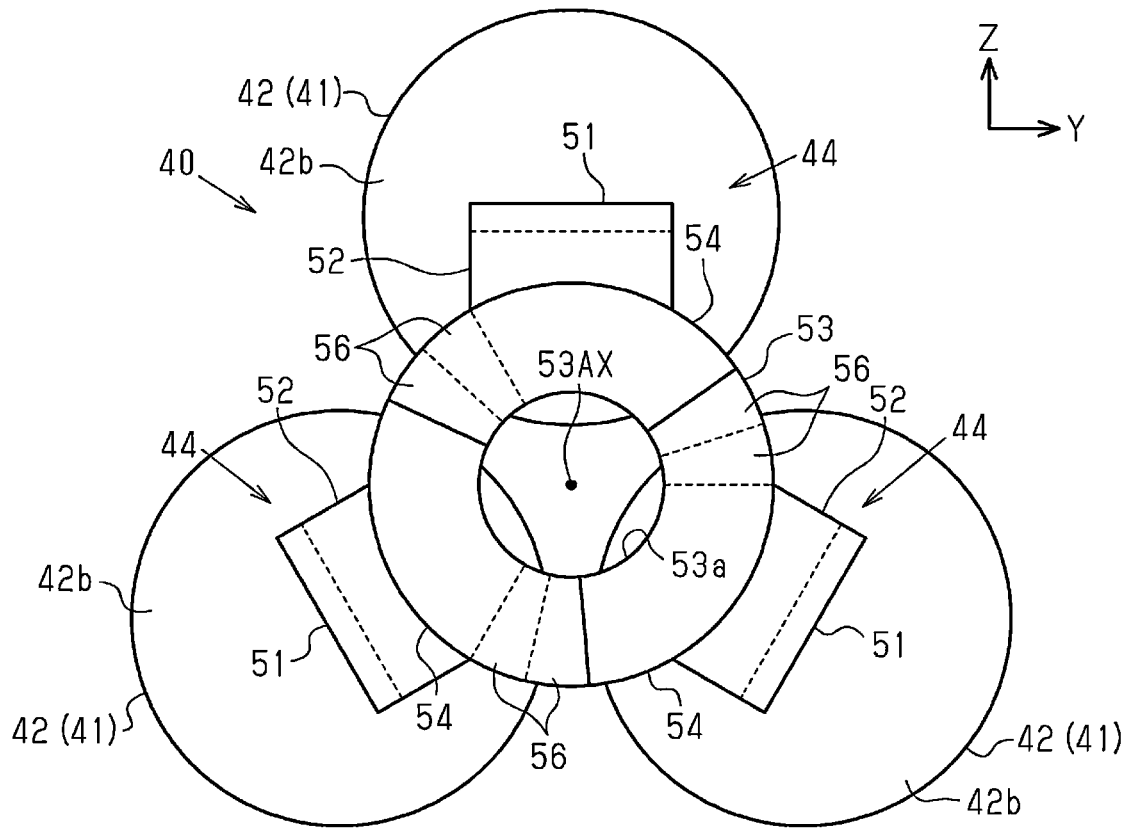
FIG. 9 is a side view of the composite fuse of FIG. 8 as viewed from a fixing tab side.
Figure 10:
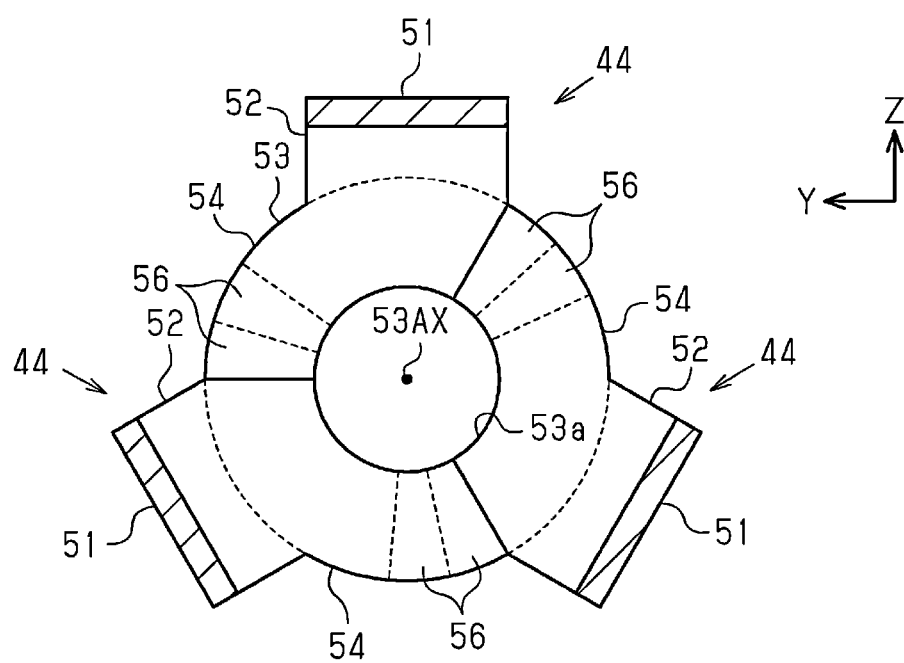
FIG. 10 is an illustrative diagram of fixing tabs of the composite fuse of FIG. 8, as viewed from a main body side.

As shown in FIGS. 8 to 10, the composite fuse 40 is constituted by three fuses 41. The three fuses 41 have the same shape and size as each other.

Each fuse 41 includes a main body portion 42, a male tab 43, and a fixing tab 44. The fixing tabs 44 of the fuses 41 are configured such that the main body portions 42 are arranged in a three-dimensional (3D) form, as described above, due to being combined with each other.

Figure 11:
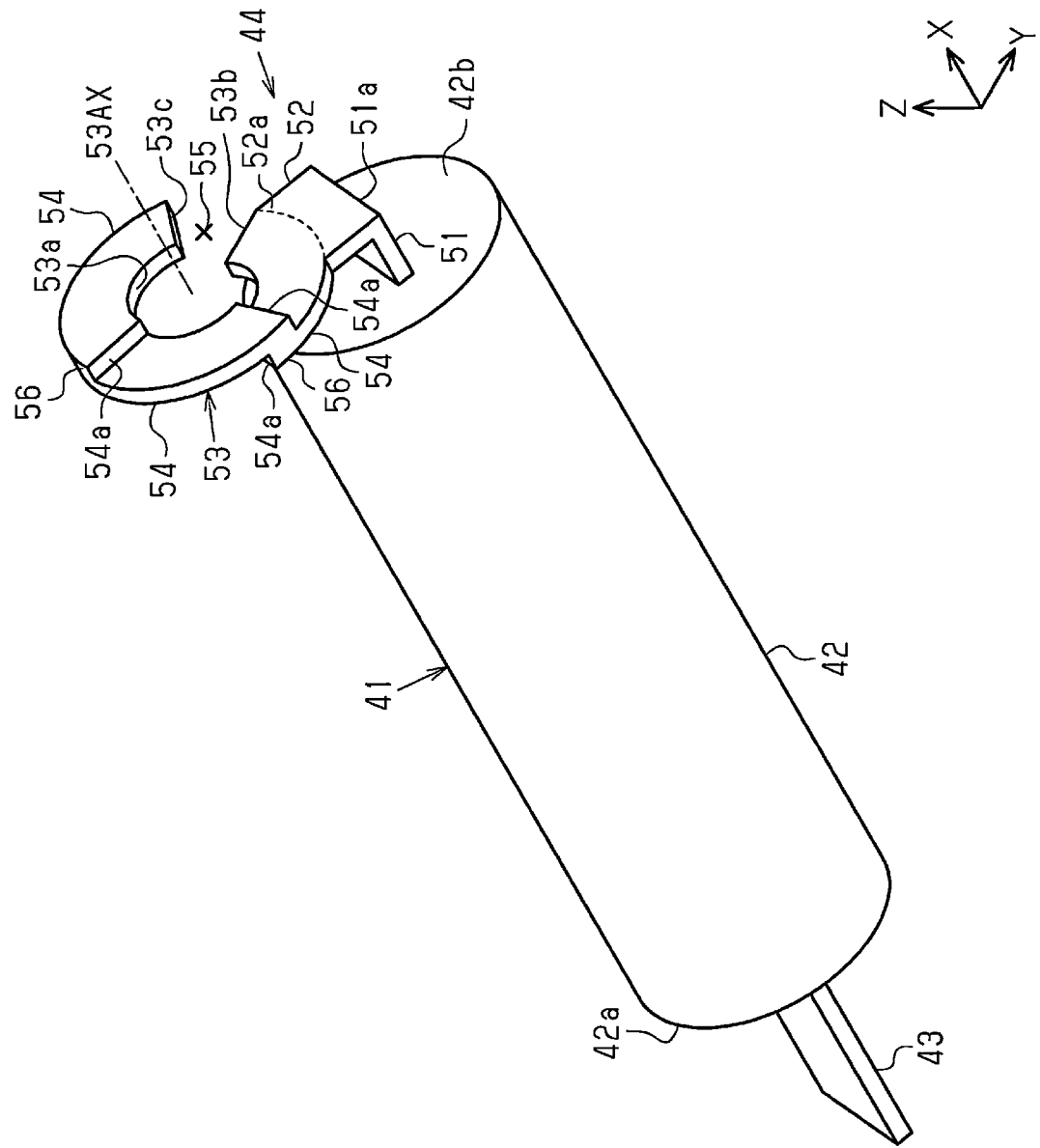
FIG. 11 is a perspective view showing one fuse included in the composite fuse shown in FIG. 8.
Figure 12:
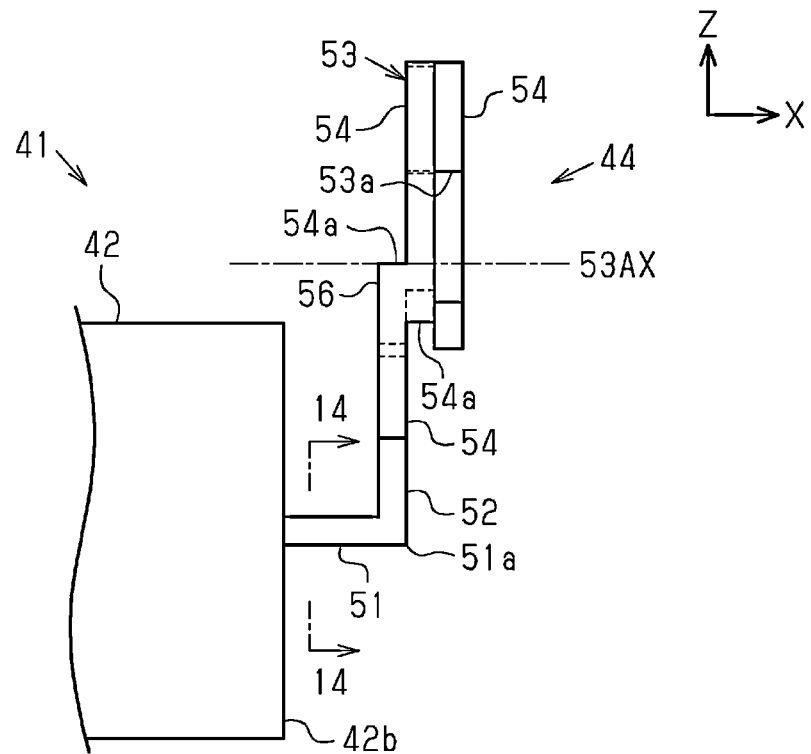
FIG. 12 is a side view showing a fixing tab of the fuse shown in FIG. 11.
Figure 13:
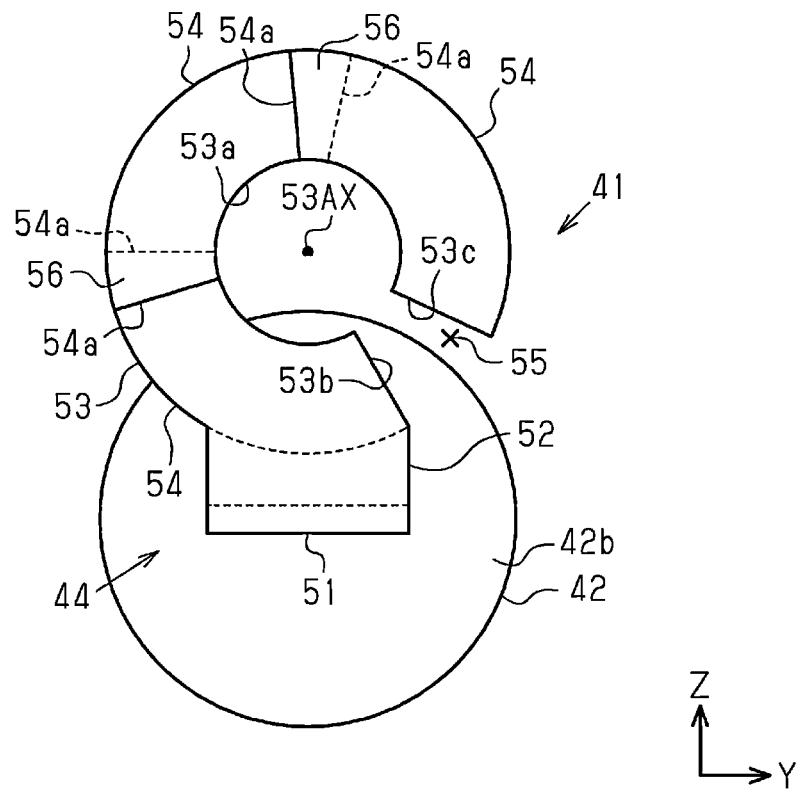
FIG. 13 is a side view of the fuse shown in FIG. 11, as viewed from the fixing tab side.

As shown in FIGS. 11 to 13, the fixing tab 44 has a first connection portion 51, a second connection portion 52, and a fixing portion 53. The first connection portion 51 extends from the second end surface 42b of the main body portion 42 in the X direction, which is a first direction in which the main body portion 42 extends. The first connection portion 51 has a leading end 51a on a side opposite to the main body portion 42. The second connection portion 52 extends from the leading end 51a of the first connection portion 51 in a second direction orthogonal to the X direction, which is the first direction, the second direction being the Z direction in FIGS. 11 to 13. The second connection portion 52 has a leading end 52a on the side opposite to the first connection portion 51.

The fixing portion 53 is connected to the leading end 52a of the second connection portion 52.

The fixing portion 53 has a fixing hole 53a passing through the fixing portion 53 along a fixing axis 53AX extending in the X direction, which is the first direction. The fixing hole 53a is formed such that the bolt 61 shown in FIG. 6 can be inserted therethrough. That is, the fixing hole 53a is an insertion hole through which the bolt 61 is inserted.

As shown in FIGS. 11 to 13, the fixing portion 53 has a plurality of fixing pieces 54. As shown in FIGS. 11 and 13, the fixing pieces 54 are arranged side by side in a circumferential direction centered on the fixing axis 53AX. Each fixing piece 54 is formed in an arc shape centered on the fixing axis 53AX. In this embodiment, the fixing portion 53 has three fixing pieces 54. The fixing pieces 54 are arranged so as to partially overlap each other in a view from the direction in which the fixing axis 53AX extends. Also, the fixing pieces 54 are integrally joined to each other at their overlapping portions. As shown in FIG. 12, in the fixing portion 53, the three fixing pieces 54 are arranged so as to be shifted with respect to each other in the direction along the fixing axis 53AX. As a result, the fixing portion 53 has level differences 54a in the circumferential direction. Also, the fixing portion 53 is formed into an open annular shape having a first annular end 53b and a second annular end 53c that are spaced apart by a predetermined interval in the circumferential direction.

In this embodiment, as shown in FIG. 13, the fixing pieces 54 are arranged at equal angular intervals so as to be shifted with respect to each other in the circumferential direction of a circle centered on the fixing axis 53AX. Each fixed piece 54 is formed so as to extend 120 degrees centered on the fixing axis 53AX. In other words, each fixed piece 54 is formed in an arc shape with a central angle of 120 degrees. Each fixed piece 54 also has an opening 55 formed between the first annular end 53b and the second annular end 53c. The opening 55 has a shape corresponding to an overlapping portion 56 of two fixing pieces 54 that are adjacent to each other in the circumferential direction in a view from the direction in which the fixing axis 53AX extends, and is formed to have a size corresponding to two overlapping portions 56 in this embodiment.

As shown in FIGS. 8 to 10, the fuses 41 including the fixing tabs 44 having the fixing portions 53 with such a shape are combined such that the fixing portions 53 are overlaid on each other so as to be shifted with respect to each other in the circumferential direction. Also, the plurality of fixing pieces 54 constituting the fixing portions 53 are combined in the circumferential direction. For example, in the three fuses 41, the fixing pieces 54 connected to the second connection portions 52 form one ring. The same also applies to the other fixing pieces 54. Since the fixing pieces 54 form a circular ring in this manner, the second connection portions 52 to which the fixing pieces 54 are connected are arranged at the same position in the direction in which the fixing axis 53AX extends. That is, in the three fuses 41 having the same shape and size as each other, the positions of the second connection portions 52 are the same in the X direction in which the fixing axis 53AX extends. That is, in the three fuses 41, the positions of the main body portions 42 and the male tabs 43 are the same in the X direction in which the fixing axis 53AX extends. As a result, the positions of the male tabs 43 in the plurality of fuses 41 can be aligned.

The fixing pieces 54 that form a ring by the three fuses 41 are overlaid on each other in the X direction in which the fixing axis 53AX extends. The number of overlapping fixing pieces 54 is the same in the circumferential direction of the fixing axis 53AX. Accordingly, the three fixing portions 53 overlaid on each other in the circumferential direction of the bolt 61 and the nut 62 have the same thickness as each other. For this reason, when the fixing tabs 44 of the three fuses 41 and the positive-side bus bar 30 are joined to each other by the bolt 61 and the nut 62, the fastening force is the same in the circumferential direction, and favorable joining can be achieved.

Operations and Effects

As described above, the electrical connection box 1 and the fuse 41 of an embodiment have the following operations and effects.

The fuse 41 includes a columnar main body portion 42 having a first end surface 42a and a second end surface 42b, a male tab 43 provided on the first end surface 42a, and a fixing tab 44 provided on the second end surface 42b. The fixing tab 44 has a first connection portion 51 extending in a first direction, a second connection portion 52 extending from a leading 51a of the first connection portion 51 in a second direction orthogonal to the first direction, and a fixing portion 53 connected to the leading end 52a of the second connection portion 52.

The fixing portion 53 has a fixing hole 53a that passes through the fixing portion 53 along a fixing axis 53AX extending in the first direction. Also, the fixing portion 53 has a plurality of fixing pieces 54. The plurality of fixing pieces 54 are arranged side by side in a circumferential direction centered on the fixing axis 53AX. Each fixing piece 54 is formed in an arc shape centered on the fixing axis 53AX. The fixing portion 53 is formed into an open annular shape that has a level difference 54a at each predetermined angle in the circumferential direction due to the plurality of fixing pieces 54 being arranged so as to be shifted with respect to each other in the first direction, and that has a first annular end 53b and a second annular end 53c spaced apart at a predetermined interval in the circumferential direction.

According to this configuration, the composite fuse 40 is formed using a plurality of the fuses 41 having the same shape and size as each other. In this case, due to the fixing portions 53 of the fixing tabs 44 being overlaid so as to be shifted with respect to each other in the circumferential direction, it is possible to arrange the plurality of main body portions 42 three-dimensionally. For this reason, the plurality of fuses 41 can be arranged at a high density, and the electrical connection box 1 including the plurality of fuses 41 can be made smaller.

The plurality of fixing pieces 54 are arranged at equal angular intervals in the circumferential direction. As a result, the main body portions 42 of the plurality of fuses 41 can be arranged at equal intervals along the circumferential direction, and the plurality of fuses 41 can be arranged at a high density.

The plurality of fixing pieces 54 are formed so as to extend 120 degrees centered on the fixing axis 53AX. This makes it possible to arrange the three fuses 41 at a high density. Also, due to the fixing tabs 44 of the three fuses 41 being overlaid so as to be shifted with respect to each other in the circumferential direction, the positions of the three male tabs 43 can be aligned in the first direction.

The electrical connection box 1 includes a metal housing 10, a positive-side bus bar 30 accommodated in the housing 10, and a negative-side bus bar 20 that is accommodated in the housing 10 and formed so as to surround the positive-side bus bar 30. The negative-side bus bar 20 surrounding the positive-side bus bar 30 serves as a noise shield together with the metal housing 10. Accordingly, by including the negative-side bus bar 20 that surrounds the positive-side bus bar 30, the thickness of the metal housing 10 that accommodates the negative-side bus bar 20 and the positive-side bus bar 30 can be made thinner, and the electrical connection box 1 can be made smaller. By reducing the size of the electrical connection box 1, it is possible to improve the degree of freedom in arranging the electrical connection box 1 in a vehicle in which it is to be mounted.

The electrical connection box 1 includes three fuses 41 surrounded by the negative-side bus bar 20. Each fuse 41 has a columnar main body portion 42 and is arranged such that the main body portion 42 extends along a first direction, and the fuses 41 are arranged along the second direction and a third direction, which intersect the first direction and intersect each other. As a result, the plurality of fuses 41 can be arranged at a high density, and the electrical connection box 1 can be made smaller.

The fuse 41 has the male tab 43 on the first end surface 42a of the main body portion 42 and the fixing tab 44 on the second end surface 42b of the main body portion 42, and the male tab 43 has the same potential as the positive-side bus bar 30. Portions having the same potential as the positive-side bus bar 30 are surrounded by the negative-side bus bar 20, and thus noise can be suppressed.

The fixing tab 44 of the fuse 41 is electrically connected to the positive-side bus bar 30. Accordingly, the male tab 43 of the fuse 41 can have the same potential as the positive-side bus bar 30.

The negative-side bus bar 20 has the bus bar-side male tabs 23 arranged so as to oppose the male tabs 43 of the fuses 41. The male tabs 43 and the bus bar-side male tabs 23 arranged so as to oppose each other form pairs to form the second external terminal 14, and thus the electrical connection box 1 and the devices 72 can be easily connected to each other.

The positive-side bus bar 30 has the positive-side connection tab 32, and the negative-side bus bar 20 has the negative-side connection tab 22 arranged so as to oppose the positive-side connection tab 32. According to this configuration, the positive-side connection tab 32 and the negative-side connection tab 22 arranged so as to oppose each other form a pair to form the first external terminal 13, and the electrical connection box 1 and the device 71 can be easily connected to each other.

In this embodiment, as shown in FIGS. 9, 11, and 13, the fixing axis 53AX may be parallel to the axis of the main body portion 42 and need not overlap with the axis of the main body portion 42. Also, the first connection portion 51 may overlap with the axis of the main body portion 42, and the fixing portion 53 need not overlap with the axis of the main body portion 42.

In this embodiment, as shown in FIG. 11, the plurality of fixing pieces 54 of each fixing portion 53 are shifted with respect to each other in the circumferential direction centered on the fixing axis 53AX and in the axial direction along the fixing axis 53AX so as to be arranged in a helical shape.

Modified Examples

The above-described embodiment can be implemented with the following modifications. The above-described embodiment and the following modified examples can be implemented in combination with each other as long as there is no technical discrepancy.

In the above embodiment, the number of fuses 41 may also be changed as appropriate. For example, the electrical connection box 1 of the above-described embodiment may also be configured to include a composite fuse 40 that is a combination of two or four or more fuses 41. In this case, the shape of the fixing tabs 44 can also be changed depending on the number of fuses 41 to be combined.

Figure 15:
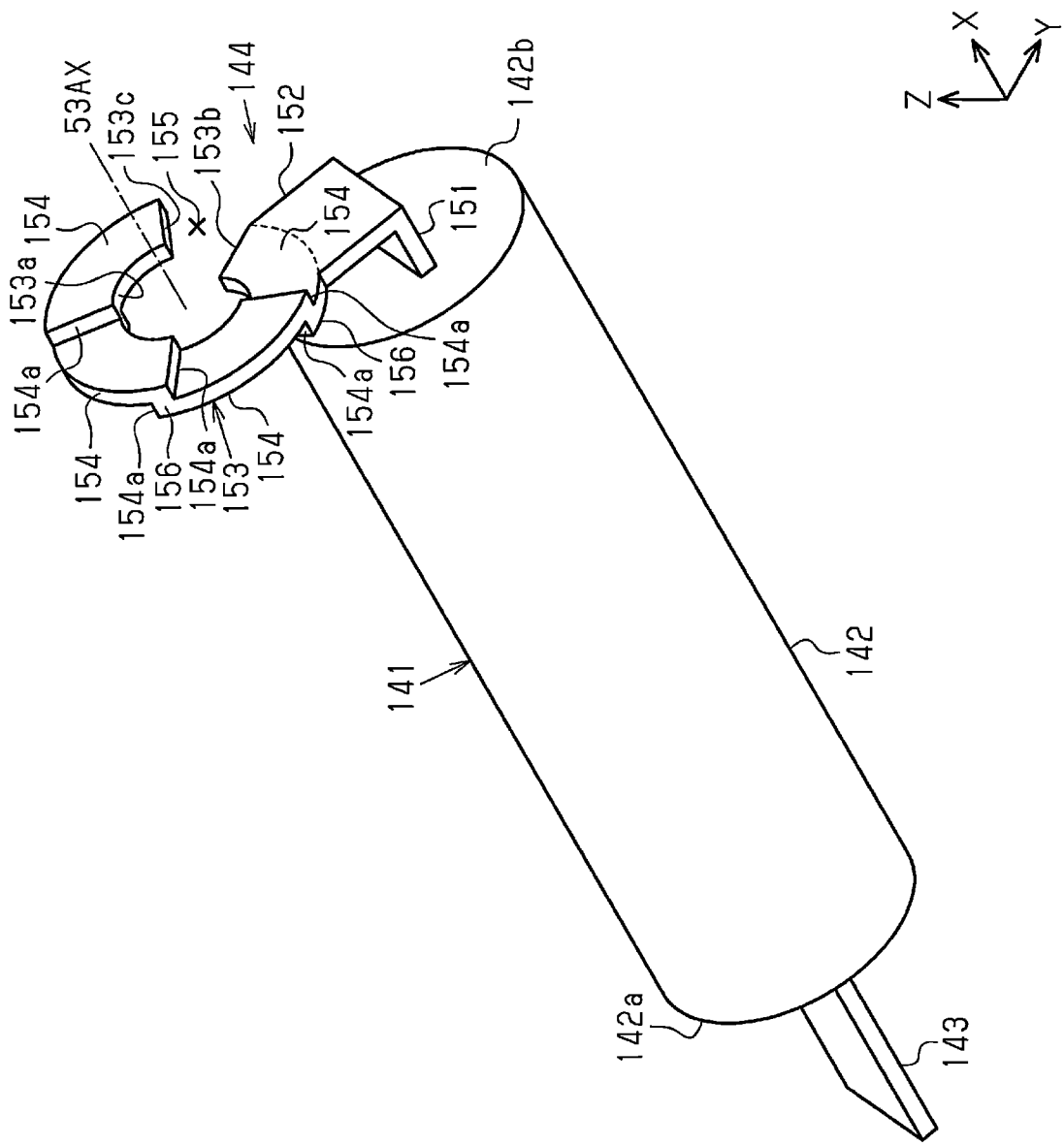
FIG. 15 is a perspective view showing a fuse according to a modified example.
Figure 16:
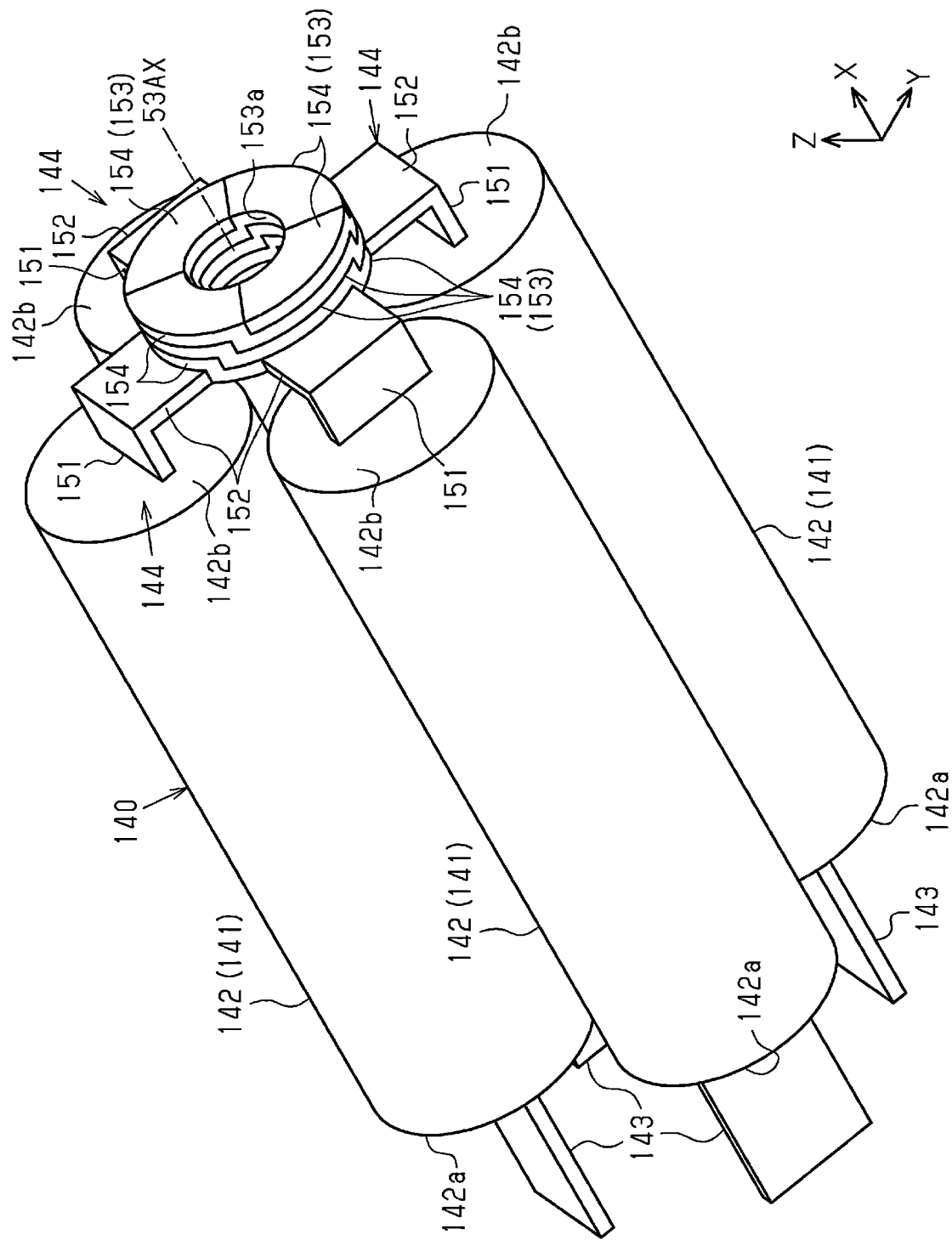
FIG. 16 is a perspective view showing a state in which the fuses shown FIG. 15 are combined.
Figure 17:
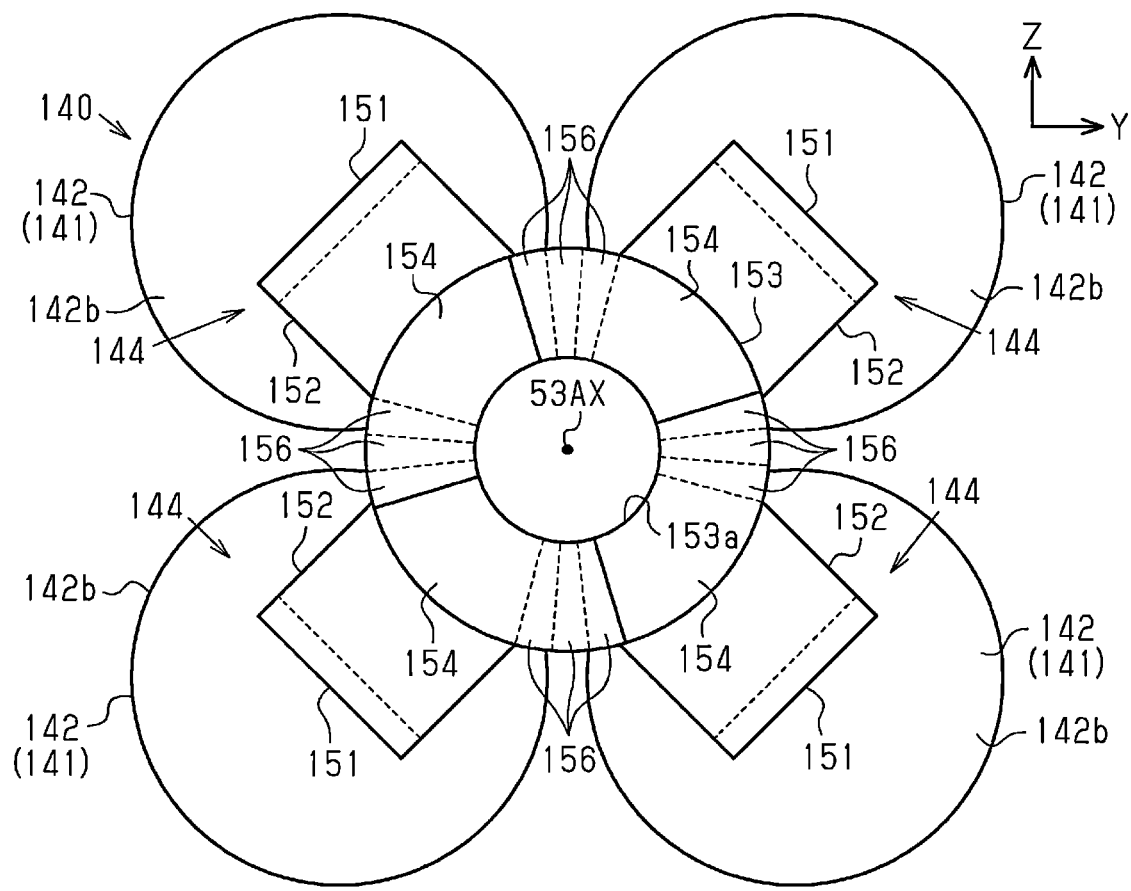
FIG. 17 is a side view of the combined fuses shown in FIG. 16.
Figure 18:
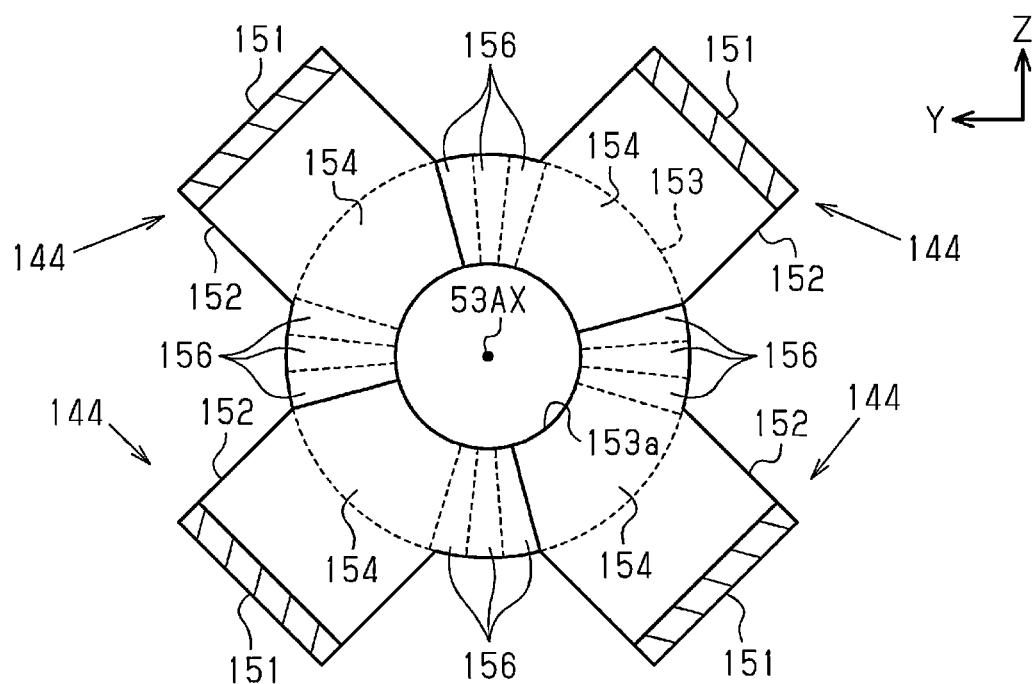
FIG. 18 is an illustrative diagram showing fixing tabs of the combined fuses shown in FIG. 16.

FIG. 15 shows one fuse 141, and FIGS. 16 to 18 show a composite fuse 140 including four of the fuses 141 shown in FIG. 15.

The fuse 141 includes a main body portion 142, a male tab 143, and a fixing tab 144. The main body portion 142 is formed in a columnar shape and has a first end surface 142a and a second end surface 142b. The main body portion 142 is configured to melt when a current of a specified value or more flows between the male tab 143 and the fixing tab 144.

The male tab 143 is provided on a first end surface 142a of the main body portion 142. The fixing tab 144 is provided on a second end surface 142b of the main body portion 142. In this modified example, the male tab 143 is formed so as to protrude from the first end surface 142a of the main body portion 142. Also, the fixing tab 144 is formed so as to protrude from the second end surface 142b of the main body portion 142.

The fixing tabs 144 of the fuses 141 are configured such that the main body portions 142 are arranged in a three-dimensional (3D) form due to being combined with each other, similarly to the fuses 41 of the above-described embodiment.

The fuse 141 of this modified example has a fixing portion 153 constituted by four fixing pieces 154. The fixing portion 153 has a fixing hole 153a passing through the fixing portion 153 along a fixing axis 53AX. The fixing pieces 154 are arranged so as to partially overlap with each other in a view from the direction in which the fixing axis 53AX extends. Also, the fixing pieces 154 are integrally joined to each other at the overlapping portions. As shown in FIG. 15, in the fixing portion 153, the four fixing pieces 154 are arranged so as to be shifted with respect to each other in the direction along the fixing axis 53AX. As a result, the fixing portion 153 has level differences 154a in the circumferential direction. Also, the fixing portion 153 is formed into an open annular shape having a first annular end 153b and a second annular end 153c spaced apart by a predetermined interval in the circumferential direction.

Each fixing piece 154 is formed so as to extend 90 degrees centered on the fixing axis 53AX. In other words, each fixing piece 154 is formed in an arc shape with a central angle of 90 degrees. Also, each fixing piece 154 has an opening 155 formed between the first annular end 153b and the second annular end 153c. The opening 155 has a shape corresponding to an overlapping portion 156 of two fixing pieces 154 that are adjacent to each other in the circumferential direction in a view from the direction in which the fixing axis 53AX extends, and has a size corresponding to three overlapping portions 156 in this embodiment.

The fuses 141 including the fixing tabs 144 having the fixing portions 153 with such a shape are combined such that the fixing portions 153 are arranged so as to be shifted with respect to each other in the circumferential direction, as shown in FIGS. 16 to 18. Also, the plurality of fixing pieces 154 constituting the fixing portions 153 are combined in the circumferential direction. For example, in the four fuses 141, the fixing pieces 154 connected to the second connection portions 152 form one ring. The same applies to the other fixing pieces 154 as well. Since the fixing pieces 154 form a ring in this manner, the second connection portions 152 to which the fixing pieces 154 are connected are arranged at the same position in the direction in which the fixing axis 53AX extends. That is, in the four fuses 141 having the same shape and size as each other, the positions of the second connection portions 152 are the same in the X direction in which the fixing axis 53AX extends. That is, in the three fuses 141, the positions of the main body portions 142 and the male tabs 143 are the same in the X direction in which the fixing axis 53AX extends. As a result, the positions of the male tabs 43 in the plurality of fuses 141 can be aligned.

Figure 14:
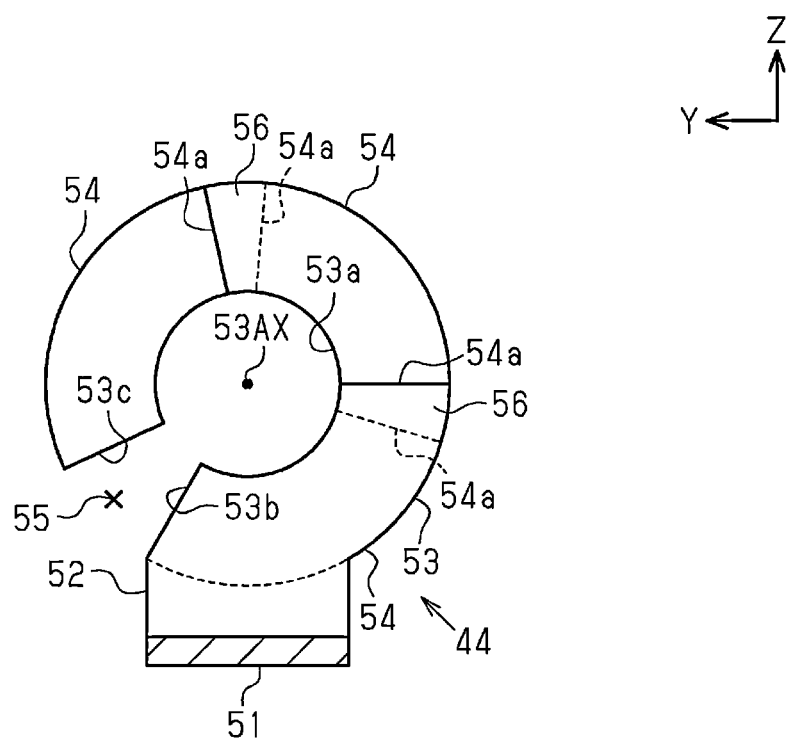
FIG. 14 is an illustrative diagram of the fixing tab of the fuse shown in FIG. 11, as viewed from the main body side.
Figure 19:
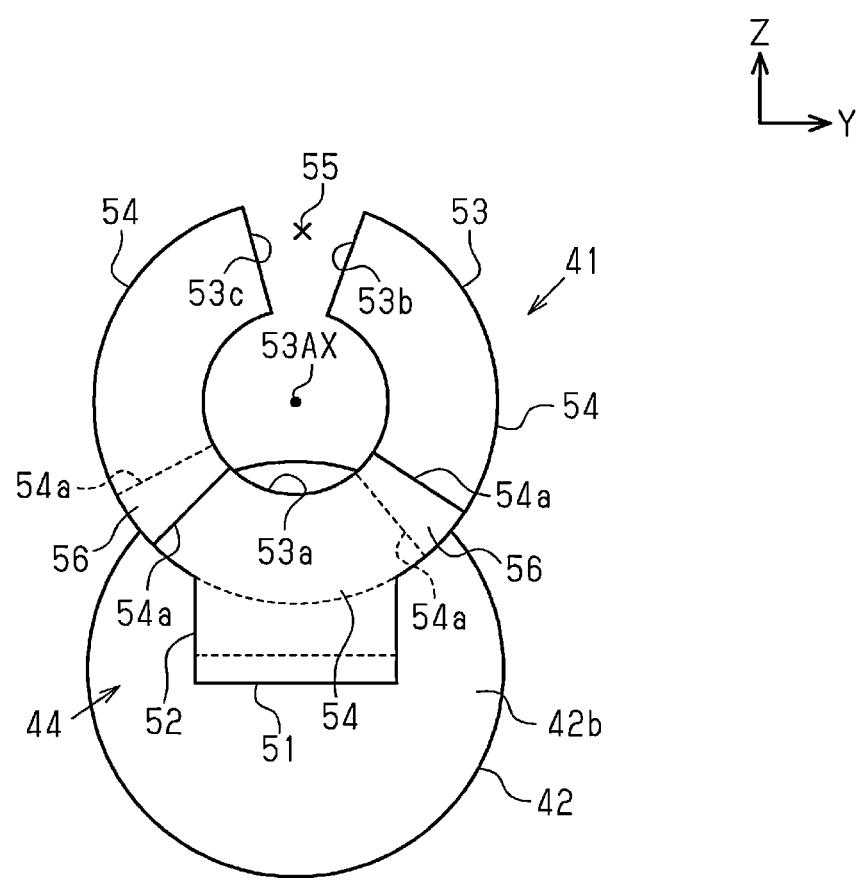
FIG. 19 is a side view of a fuse according to another modified example, as viewed from a fixing tab side.

In the above-described embodiment, as shown in FIGS. 13 and 14, the plurality of fixing pieces 54 constituting the fixing portions 53 were arranged side by side in one direction from the second connection portion 52 in the circumferential direction, but the fixing pieces 54 connected to the second connection portion 52 may also be changed as appropriate. For example, in the above-described embodiment, the fixing portion 53 was configured such that the fixing piece 54 forming the first annular end 53b is connected to the second connection portion 52, but the fixing portion 53 may also be configured such that the fixing piece 54 forming the second annular end 53c is connected to the second connection portion 52. In this case, the fixing pieces 54 are arranged side by side from the second connection portion 52 toward the main body portion 42 along the fixing axis 53AX. Also, as shown in FIG. 19, the fixing portion 53 may be configured to connect a fixing piece 54 that does not form the first annular end 53b and the second annular end 53c to the second connection portion 52.

In the above-described embodiment, the fixing tabs 44 of the fuses 41 and the positive-side bus bar 30 are connected by the bolt 61 and the nut 62, but the fixing tabs 44 and the positive-side bus bar 30 may also be connected through, for example, welding or the like.

In the above-described embodiment, the negative-side bus bar 20 had an approximate circular tube shape, but it may also have another shape, such as a quadrangular tube shape.

Also, the shape of the negative-side bus bar 20 can be changed according to the shape of the composite fuse 40 surrounded by the negative-side bus bar 20.

In the above-described embodiment, the housing 10 of the electrical connection box 1 had a columnar shape, but it may also have another shape, such as a quadrangular tube shape or a quadrangular box shape.

The fixing portion 53 in the illustrated example is referred to in some cases as a spiral staircase terminal of the fuse 41 or a spiral staircase portion of the fixing tab 44. Each fixing piece 54 of the fixing portion 53 is referred to in some cases as a step of the spiral staircase terminal of the fuse 41 or of the spiral staircase portion of the fixing tab 44. The total number of fixing pieces 54 included in one fixing tab 44, that is, the number of steps of the spiral staircase terminal of the fuse 41 or the spiral staircase portion of the fixing tab 44, may coincide with the total number of fuses 41 included in one composite fuse 40. The same also applies to the fuses 141.

In the example of FIGS. 8 and 9, the set of three fuses 41 or the composite fuse 40 is referred to in some cases as a fuse array in a trefoil formation. In the example of FIGS. 16 and 17, the set of four fuses 141 or the composite fuse 140 is referred to in some cases as a fuse array in square or quatrefoil formation.

The embodiments and modified examples disclosed herein are to be considered exemplary in all respects and not as limiting. The scope of the present disclosure is indicated not by the above-described meaning but by the scope of the claims, and all modifications that fall within the meaning and scope equivalent to the scope of the claims are intended to be encompassed therein.

The invention claimed is:

1. A fuse, comprising:
   a columnar main body portion having a first end surface and a second end surface;
   a male tab provided on the first end surface; and
   a fixing tab provided on the second end surface,
   wherein the main body portion is configured to melt when a current of a predetermined value or more flows between the male tab and the fixing tab,
   the fixing tab includes a first connection portion extending in a first direction in which the main body portion extends, a second connection portion extending from a leading end of the first connection portion in a second direction orthogonal to the first direction, and a fixing portion that is connected to a leading end of the second connection portion and has a fixing hole passing through the fixing portion along a fixing axis extending in the first direction, and
   the fixing portion has a plurality of fixing pieces that are arranged side by side in a circumferential direction centered on the fixing axis and that are formed into arc shapes centered on the fixing axis, and the fixing portion is formed into an open annular shape that has a level difference at each predetermined angle in the circumferential direction due to the plurality of fixing pieces being arranged so as to be shifted with respect to each other in the first direction, the open annular shape having a first annular end and a second annular end that are spaced apart from each other at a predetermined interval in the circumferential direction.

2. The fuse according to claim 1, wherein the plurality of fixing pieces are arranged at equal angular intervals in the circumferential direction.

3. The fuse according to claim 2, wherein each of the plurality of fixing pieces is formed so as to extend 120 degrees centered on the fixing axis.

4. The fuse according to claim 2, wherein each of the plurality of fixing pieces is formed so as to extend 90 degrees centered on the fixing axis.

5. A composite fuse comprising a plurality of the fuses according to claim 2,
   wherein the plurality of fuses are arranged such that the respective fixing axes are coaxial with each other, and
   the main body portions of the plurality of fuses are arranged at the same position in a direction along the respective fixing axes, and are mutually arranged on the same circumference centered on the respective fixing axes.

6. The fuse according to claim 1, wherein each of the plurality of fixing pieces is formed so as to extend 120 degrees centered on the fixing axis.

7. A composite fuse comprising a plurality of the fuses according to claim 6,
   wherein the plurality of fuses are arranged such that the respective fixing axes are coaxial with each other, and
   the main body portions of the plurality of fuses are arranged at the same position in a direction along the respective fixing axes, and are mutually arranged on the same circumference centered on the respective fixing axes.

8. The fuse according to claim 1, wherein each of the plurality of fixing pieces is formed so as to extend 90 degrees centered on the fixing axis.

9. A composite fuse comprising a plurality of the fuses according to claim 8,
   wherein the plurality of fuses are arranged such that the respective fixing axes are coaxial with each other, and
   the main body portions of the plurality of fuses are arranged at the same position in a direction along the respective fixing axes, and are mutually arranged on the same circumference centered on the respective fixing axes.

10. A composite fuse comprising a plurality of the fuses according to claim 1,
    wherein the plurality of fuses are arranged such that the respective fixing axes are coaxial with each other, and
    the main body portions of the plurality of fuses are arranged at the same position in a direction along the respective fixing axes, and are mutually arranged on the same circumference centered on the respective fixing axes.

11. An electrical connection box comprising:
    a metal housing;
    a positive-side bus bar accommodated in the housing;
    a negative-side bus bar that is accommodated in the housing and is formed so as to surround the positive-side bus bar; and
    the composite fuse according to claim 1,
    wherein the plurality of fuses are surrounded by the negative-side bus bar,
    the main body portions of the plurality of fuses are arranged at the same position in a direction along the respective fixing axes, and are mutually arranged on the same circumference centered on the respective fixing axes, and
    the fixing tabs of the plurality of fuses are overlaid on each other so as to be in contact with each other, with the respective fixing axes coaxial with each other.

12. The electrical connection box according to claim 11, wherein the male tab of the fuse has the same potential as the positive-side bus bar.

13. The electrical connection box according to claim 12, wherein the fixing tab of the fuse is electrically connected to the positive-side bus bar.

14. The electrical connection box according to claim 13, wherein the negative-side bus bar has a bus bar-side male tab arranged so as to oppose the male tab of the fuse.

15. The electrical connection box according to any one of claim 13,
   wherein the positive-side bus bar has a positive-side connection tab, and
   the negative-side bus bar has a negative-side connection tab arranged so as to oppose the positive-side connection tab.

16. The electrical connection box according to claim 12, wherein the negative-side bus bar has a bus bar-side male tab arranged so as to oppose the male tab of the fuse.

17. The electrical connection box according to any one of claim 16,
   wherein the positive-side bus bar has a positive-side connection tab, and
   the negative-side bus bar has a negative-side connection tab arranged so as to oppose the positive-side connection tab.

18. The electrical connection box according to any one of claim 12,
   wherein the positive-side bus bar has a positive-side connection tab, and
   the negative-side bus bar has a negative-side connection tab arranged so as to oppose the positive-side connection tab.

19. The electrical connection box according to claim 6,
   wherein the positive-side bus bar has a positive-side connection tab, and
   the negative-side bus bar has a negative-side connection tab arranged so as to oppose the positive-side connection tab.

* * * * *